April 14, 1953     H. C. SIMONS     2,634,670
HEATER CONTROL
Filed April 22, 1949            3 Sheets-Sheet 1
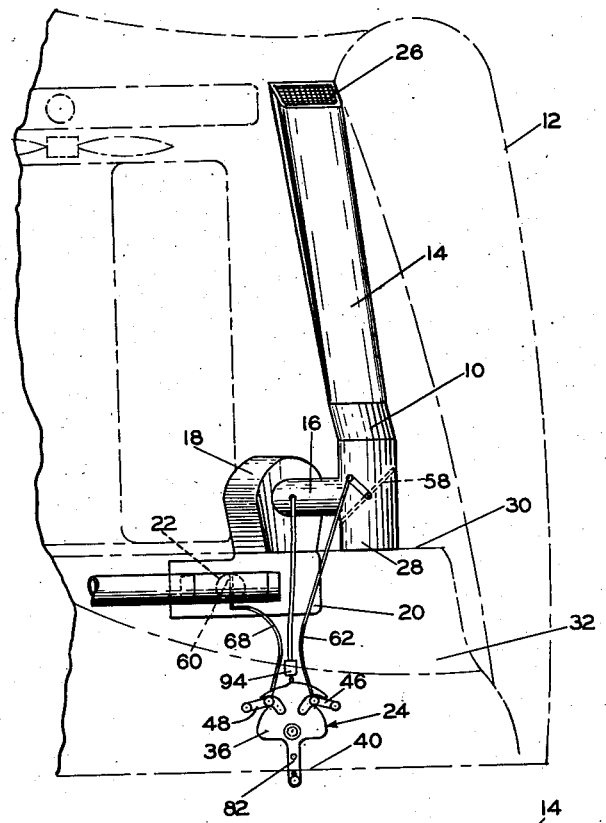
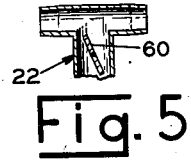
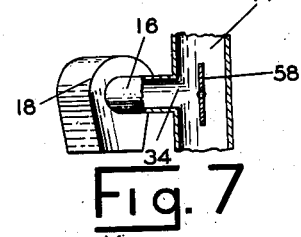
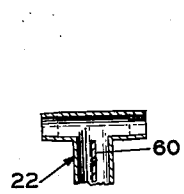
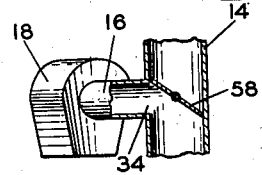
INVENTOR.
HOMER CHARLES SIMONS
BY
*McDonald & Teagno*
ATTORNEYS

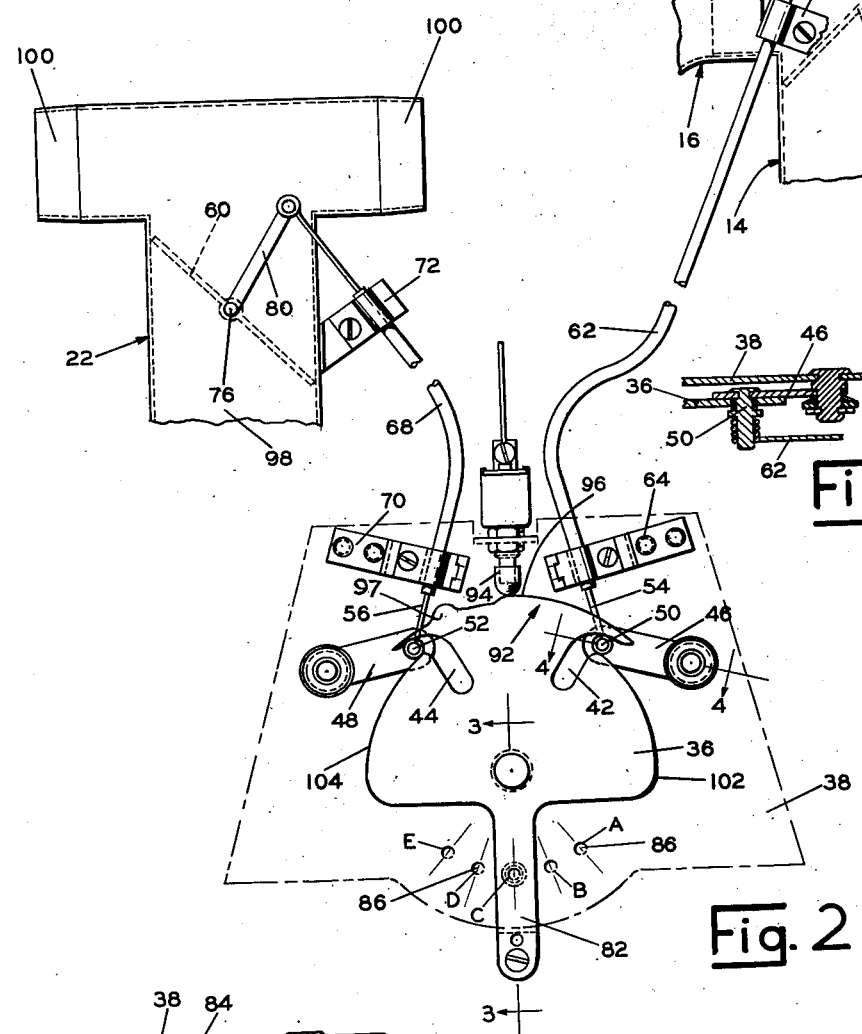

April 14, 1953                     H. C. SIMONS                     2,634,670
                                   HEATER CONTROL
Filed April 22, 1949                                            3 Sheets-Sheet 3
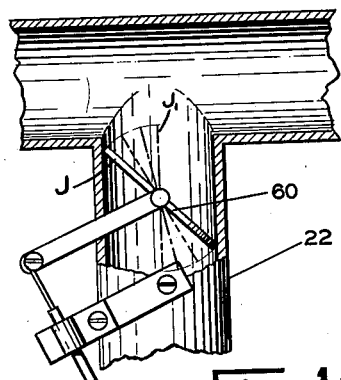
Fig. 10
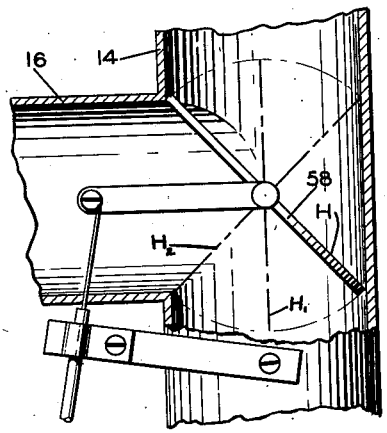
Fig. 11
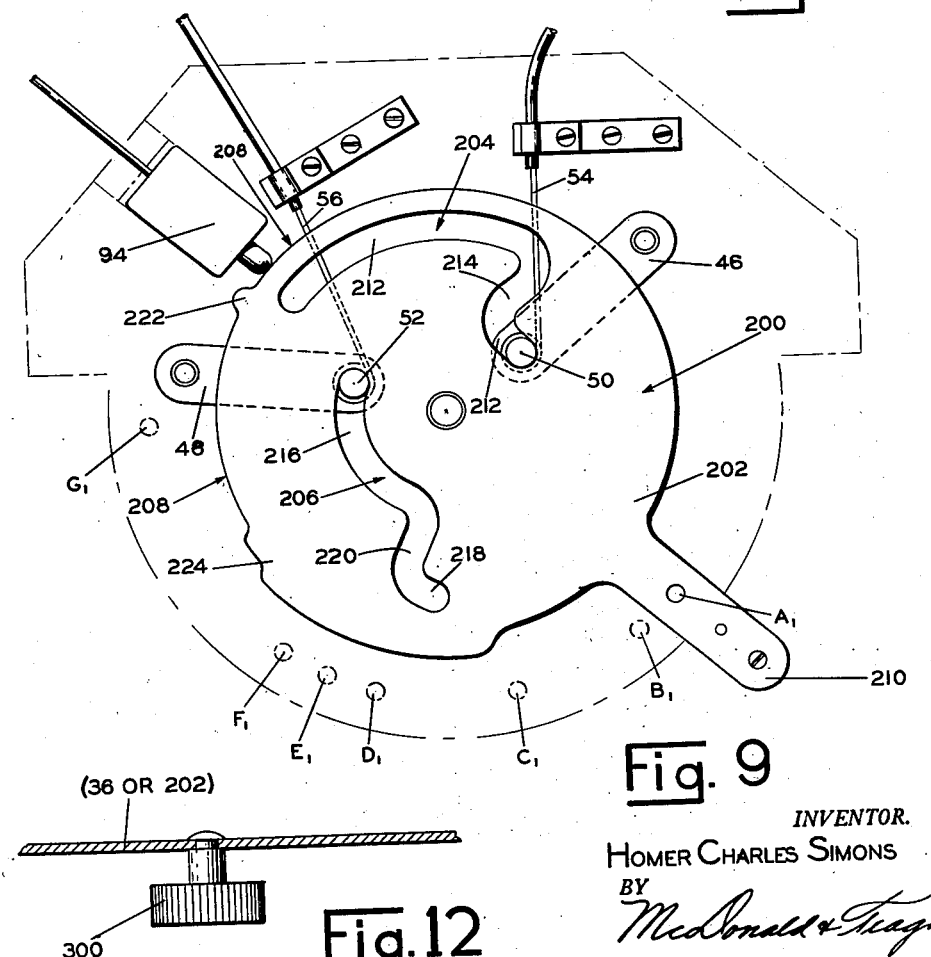
Fig. 9
Fig. 12
INVENTOR.
HOMER CHARLES SIMONS
BY
McDonald & Teagno
ATTORNEYS Patented Apr. 14, 1953

2,634,670

UNITED STATES PATENT OFFICE 2,634,670

HEATER CONTROL

Homer Charles Simons, Maple Heights, Ohio, assignor to Eaton Manufacturing Company, Cleveland, Ohio, a corporation of Ohio Application April 22, 1949, Serial No. 89,070

6 Claims. (Cl. 98—2)

This invention relates to heaters and more particularly to control means for vehicle space heaters of the fresh air type.

Broadly the invention comprehends the provision of a single lever control means for effectively modulating the flow of fresh and recirculated air to a heat exchange apparatus and, for controlling the flow of heated air from the heat exchange apparatus.

An object of the invention is the provision of a single manually operable actuator for controlling two or more air flow control elements associated with a vehicle space heater.

Another object of the invention is the provision of a manually operable switch for controlling air flow through and from a fresh air vehicle space heater permitting of several different variations of air delivery to suit weather and temperature conditions to which the vehicle is subjected.

Another object of the invention is the provision of a fresh air vehicle space heater having a single control means effective to permit of modulated fresh air and recirculated air control, modulated heated air delivery to the vehicle windshield and control the operation of air impelling means for the heater.

A further object of the invention is the provision of a fresh air heater of the type having ducting extending from the exterior to the interior of the vehicle to which it is adapted, branch ducting extending from a point intermediate the main ducting to the interior of the vehicle, said branch ducting containing therein an air impelling means as well as a heat exchange apparatus and vehicle windshield defrosting ducting associated with the outlet from the heater and wherein a single lever actuator is provided adapted to control appropriate valving at the juncture of the main and branch ducts, valving in the defroster ducting and the air impelling means for the desired operation of the heater so as to render the necessary heating requirements of the occupants of the vehicle and for proper defrosting of the vehicle windshield.

Other objects and advantages of the invention will appear from the following description taken in connection with the drawings, forming a part of the specification, and in which:

Fig. 1 is a top plan view of a combination fresh air heating and ventilating system incorporating a single lever control actuator therefor as applied to an automotive vehicle;

Fig. 2 is a fragmentary enlarged top plan view of the lever control actuator of Fig. 1 and the elements to be actuated thereby in association with portions of the heating and ventilating system;

Fig. 3 is a cross-sectional view taken substantially along lines 3—3 of Fig. 2;

Fig. 4 is a cross-sectional view taken substantially along lines 4—4 of Fig. 2;

Fig. 5 is a fragmentary cross-sectional view of an actuated position of the air control valve in the windshield defroster ducting;

Fig. 6 is a fragmentary cross-sectional view of another position of the air control valve in the windshield defroster ducting;

Fig. 7 is a fragmentary cross-sectional view of the air control valve at the juncture of the main and branch ductings in one position of operation;

Fig. 8 is a fragmentary cross-sectional view of the air control valve at the juncture of the main and branch ductings in another position of operation;

Fig. 9 is a top plan view of a modified form of a single lever actuator from that shown by Figs. 1 and 2;

Fig. 10 is a cross-sectional view of the windshield defroster ducting having an air control valve therein adapted to be controlled for operation by the actuator of Fig. 9;

Fig. 11 is a cross-sectional view of the main and branch ducting juncture such as employed in the structure of Fig. 1 with an air control valve therein adapted to be controlled for operation by the actuator of Fig. 10; and Fig. 12 is a fragmentary modified form of manually operable member for the actuator of Fig. 10.

This invention is predicated on the provision of a simple single lever operating actuator for controlling two or more elements associated with a fresh air vehicle space heater effective to provide for the desired delivery of heated air therefrom. Through the use of a single lever actuator a positive desired condition of operation of an associated heater can be attained with little effort or thought on the part of the operator while at the same time a cost saving in structure is achieved.

The actuator mechanism as herein constructed comprises a plate or lever pivoted upon a bracket having a plurality of cam engaging surfaces formed therein engageable with a like number of control wires or elements connected with apparatus to be actuated thereby, such as valves to control the flow of air to a heat exchange member or passenger compartment associated with a combination heating and ventilating system for vehicles and for controlling the delivery of heated air to a windshield of the vehicle for defrosting purposes, and switch means for controlling the operation of air impeller apparatus associated with the heating and ventilating system. The lever is movable to several predetermined positions permitting of a variety of air delivery conditions to the passenger compartment and windshield of the vehicle in which the system is incorporated. By properly designing the cam surfaces of the actuator in respect to one another, the various control wires can be manipulated simultaneously with or independently of one another so as to effect a plurality of air delivery conditions which might otherwise require the manipulation of several different independent actuators and/or switches if they were not as here integrated or linked relative to one another.

Referring to Figs. 1 and 2 of the drawings for more particular details of the invention 10 represents generally an automotive vehicle combination heating and ventilating system as applied to an automotive vehicle illustrated in part by outline 12 comprising a main or major fresh air conveying duct 14, a branch air conveying duct 16, a blower or air impelling apparatus 18, a heat exchange unit 20, windshield defroster ducting 22 and an actuator mechanism 24.

The specific type of combination heating and ventilating system herein disclosed comprises air duct 14 which extends from the front of the vehicle at an air intake end 26 to an air discharge end 28 located in the dash 30 of the vehicle in air discharging relation into the passenger compartment 32 of the vehicle.

The air duct 16 is arranged to have air communication at any appropriate point in the extension of duct 14 between the respective ends 26 and 28 thereof and forms therewith a junction 34, the purpose of which will hereinafter appear, for the delivery of air therefrom to blower apparatus 18 with which its other end has air communication relation disposed from communication with duct 14. The blower apparatus 18 is connected at its air discharge into the air inlet side of heat exchange unit 20, and the unit 20 in turn discharges air directly into the passenger compartment through air outlet openings, not shown, and to the windshield of the vehicle by way of windshield defroster ducting 22 having air communication with an air discharge therefrom.

The air to be delivered to the passenger compartment either through the duct 14 or duct 16, blower apparatus 18, and heat exchange unit 20, the heated air to be delivered to the windshield as discharged from the heat exchange unit 20 through ducting 22 and the operation of the air impeller incorporated in blower apparatus 18 are all controlled from the manually operable master actuator 24.

The actuator 24 comprises a disc like member 36 pivotally mounted upon bracket 38 adapted to be suitably located at a convenient place on or near the instrument panel 40 for ease of manual manipulation having cams 42 and 44 respectively therein engageable with the free ends of levers 46 and 48 respectively arranged in spaced pivotal relation to one another on bracket 38.

The cams 42 and 44 receive therein posts 50 and 52 respectively fixedly mounted on the free ends of levers 46 and 48 such that upon oscillation of the disc 36 motion is imparted to one or the other of the levers 46 or 48.

The posts 50 and 52 each have the pigtail ends of Bowden wires 54 and 56 respectively attached thereto, said wires in turn being attached respectively to air control valves 58 and 60. The wire 54 is guided in a tube 62 therefor secured by bracket 64 mounted on bracket 38 and bracket 66 mounted on ducting 14 whereas wire 56 is guided in a tube 68 therefor secured by bracket 70 mounted on bracket 38 and bracket 72 mounted on defroster ducting 22.

The air control valves 58 and 60 are pivoted respectively, 58 in the main duct at the junction of the main and branch ducts for the purpose of effecting a dual control of air through both ducts for the delivery (1) of fresh air—all through branch duct 16 to the heat exchange unit 20, (2) of fresh air—substantially all directly to the passenger compartment through the full length of the main duct 14, or (3) of recirculated air—from the passenger compartment through that portion of main duct 14 extending between the passenger compartment and branch duct 16 for recirculation through the heat exchange unit 20 and 60 in the defroster ducting to modulate the flow of air to the windshield of the vehicle with which the heating system is associated between zero air flow and maximum air flow to be handled by said ducting. The pivot shafts 74 and 76 respectively of valves 58 and 60 are connected to the opposite ends of wires 54 and 56 from those associated with posts 50 and 52 by way of the respective levers 78 and 80.

As a means of establishing positions of the valves 58 and 60 for certain desired conditions of the operation of the heating and ventilating system the disc 36 is provided with a control arm 82 extending radially therefrom for manual operation, said arm in turn having a spring pressed ball 84 incorporated therein engageable with a plurality of accurately arranged perforations or recesses 86 in bracket 38. Upon the movement of the arm 82 effecting a movement of plate 36 to a position wherein the ball 84 enters one of the recesses 86 the plate will be resiliently held in said position with a slight load sufficient to maintain said position unless it is desired to shift the actuator disc to another position. For clarity of subsequent recitation the recesses 86 are designated, reading in a clockwise direction, A, B, C, D and E, C constituting the generally central or neutral position of the plate 36.

For the purpose of providing a visual means of determination of the operative position of the respective valves 58 and 60, the face 88 of an angular flange 90 of bracket 38 can be inscribed with the proper nomenclature corresponding to the operative positions of the valves.

In addition to the cams 42 and 44 the disc 36 is provided with a cam surface 92 opposite from the arm 82 engageable with a micro switch 94 or any other suitable form of switch for controlling the operation of an air impeller forming a part of blower apparatus 18, such that air can be impelled through the heat exchange unit for delivery to the passenger compartment or windshield in accordance with predetermined desired conditions. The cam surface 92 has riser portions 96 and 97 thereon which when in engagement with the switch causes the impeller to be placed in operation and maintain same in operation for a particular movement of the actuator. It is readily conceivable that the air impelling operation could either be a continuous one in connection with the operation of valves 58 and 60 or that it could be controlled independently of the actuator disc 36 for operation as desired.

With the arm 82 of the actuator disc 36 in position C as shown by Fig. 2, the valve 58 is in position to provide for the full delivery of fresh air from the intake 26 of duct 14 through duct 16 and heat exchange unit 20 to the passenger compartment whereas valve 60 is in a position inhibiting the passage of any air from the inlet side 98 of ducting 22 for discharge through outlets 100 adapted to be connected with appropriate air tubing for air conveyance to the vehicle windshield, and air impeller of blower apparatus is in operation for air delivery under pressure to the passenger compartment.

The oscillation of arm 82 from position C to B results in causing movement of lever 48 through the engagement of post 52 with cam 44 thereby through the movement of wire 56 to actuate lever 80 for the movement of valve 60 to the position shown by Fig. 5 thereby permitting the partial delivery of air through the defroster ducting 22 to the vehicle windshield. During the movement of actuator disc 36 the riser portion of cam surface 92 remains in engagement with the switch providing for the continued operation of the air impeller for the delivery of air both to the passenger compartment and windshield. With the further oscillation of arm 82 and actuator disc 36 clockwise to position A of arm 82 the cam 44 in engagement with post 52 because of its predetermined configuration causes a further actuation of lever 48, wire 56, lever 80 and valve 60 to move the valve 60 to the position described by Fig. 6 so that a maximum possible delivery of air can be provided through the ducting 22 to the windshield. Likewise as at position B the air impeller will continue in operation because of the continued engagement of the switch on the riser portion of cam surface 92.

During the period that the actuator disc 36 is oscillated between positions C and A, the control valve 58 remains motionless inasmuch as the post 50 is moved out of engagement with cam 42 and is solely guided and retained in its established position, as shown by Fig. 1, by arcuate portion 102 on plate 36 scribed about the axis thereof.

As the arm 82 is operatively moved in a clockwise direction from any of positions A, B, or C to position C, the ball 84 incorporated therein engages in recess 86 and maintains the arm so positioned, cam 42 because of its configuration engages post 50 causing a counterclockwise rotation of lever 46 and movement of wire 54 effective to actuate lever 48 and valve 58 to the position shown by Fig. 7 wherein substantially all of the air received at the intake end of the duct 14 is directed by impact in the course of travel of the vehicle through to the discharge end 28 of the duct into the passenger compartment thereof with only negligible stray flow of air through duct 16. For all measurement purposes no air is delivered through duct 16 under these conditions to the blower apparatus which during this positioning of valve 58 is not in operation inasmuch as the switch 94 is out of engagement with the riser portion 96 of cam 92 thereby ceasing the operation of the air impeller.

Further movement of arm 82 in a clockwise direction from position D to E results in rotating the valve 58 counterclockwise to the position shown by Fig. 8 wherein the fresh air received at the intake end 26 of duct 14 is inhibited from passage to air duct 16 or the passenger compartment whereas at the same time a recirculated path of compartment air flow is permitted through the inner end of the duct 14, duct 16, blower apparatus 18, and heat exchange unit 20 as the riser portion 97 of cam surface 92 engages switch 94 for the resultant operation of the blower apparatus controlled thereby. The air impeller is also inoperative at position E of arm 82 as it was at position D.

During the period of movement of arm 82 from position C to E, the valve 60 remains closed as of position C of arm 82 as shown by Fig. 1 in that the cam 44 is disengaged from the post 52 and the lever 48 is guided by arcuate portion 104 of actuator disc 36 scribed about the axis of actuator disc 36 so as to not impart any motion to lever 48, wire 56, lever 80 and valve 60.

Although arm 82 is movable to positive positions A, B, C, D, and E, it is possible if desired to position the arm 82 anywhere intermediate to parking positions of A, B, C, D and E so as to obtain a modulated control as compared to the hereinbefore recited control.

Fig. 9 discloses a modified form of actuator 200 from that of actuator 24 of Fig. 1 similarly adaptable to the combination heating and ventilating system disclosed by Fig. 1 wherein the actuator comprises a pivoted disc 202 having cams 204 and 206 therein engageable with posts 50 and 52 of levers 46 and 48 respectively, an external cam surface 208 and a manually controllable arm 210. The posts 50 and 52 of levers 46 and 48 respectively are, as shown in Fig. 1, connected to air control valves 58 and 60 for the controlled operation thereof. The cam surface 208 is engageable to control switch 94 for the operation of an air impeller such as described relative to the system of Fig. 1.

The cams 204 and 206 are so designed as to provide for a multiple of operating positions of valves 58 and 60 independently of and simultaneously with one another and wherein the arcuate portions 212 and 214 of cam 204 provide continuous fixed operating conditions of valve 58 whereas portion 216 effects a modulated or changed operation thereof. Likewise the arcuate portion 218 of cam 206 provides a constant condition or positioning of valve 60 for whatever angular movement of plate 202 across said arcuate portion whereas portion 220 provides for a modulated control of valve 60.

The actuator disc 202 can be positioned in any one of the positions $A_1$, $B_1$, $C_1$, $D_1$, $E_1$, $F_1$, and $G_1$ for whatever air flow operation of the heater ventilator desired with which the switch is associated.

The cam surface 208 is truely arcuate in form with the exception of riser portion 222 and two stage riser portion 224, wherein the second stage of riser 224 extends arcuately through the predetermined angular portion of the external surface of the plate.

In view of the two stage riser portion 224 of cam 208, the switch 94 is as designed for this application required to have two speeds to thus control the air impeller connected therewith through two speed stages of operation.

With the control arm 210 in position $A_1$, the valve 58 is in the full line position H of Fig. 11 whereby fresh air is inhibited from passage to the passenger compartment while at the same time the duct 14 is open to duct 16 for recirculation therethrough from the passenger compartment. During this operation with the switch riding on the generally arcuate portion of cam surface 208, the air impeller is inoperative and the valve 60 as shown is closed to air flow through ducting 22. A clockwise rotation of arm 210 to position $B_1$, solely causes engagement of riser 222 with the switch to cause a low speed operation of the air impeller connected thereto effective to cause a recirculation by way of duct 14, duct 16, blower apparatus into heat exchange unit 20 back to the passenger compartment. At position $B_1$, the valves 58 and 60 remain in set position inasmuch as the posts 50 and 52 follow the arcuate paths of cam portions 212 and 216 respectively of cams 204 and 206 and thus imparts no motion to levers 46 and 48.

Upon movement of arm 210 to position $C_1$, the post 50 is carried along portion 214 of cam 204 effecting a movement of lever 46 counterclockwise resulting in moving valve 58 to dotted line position $H_1$ wherein, substantially all of the fresh air received by duct 14 is passed therethrough directly to the passenger compartment. Simultaneously with the movement of valve 58 to open ventilation in passing from position $B_1$ to $C_1$, the post continues to follow the arcuate path of portion 216 of cam 206 and this does not disturb the closed setting of valve 60 and the switch 94 is again disengaged from riser 222 so as to stop the operation of the air impeller at this position of valves 58 and 60.

As the arm 210 is further oscillated clockwise to position $D_1$ the post 50 is further actuated counterclockwise by portion 214 of cam 204 effective to move the valve 58 by way of wire 54 to $H_2$ shown by Fig. 11 permitting of the full delivery of fresh air through duct 14 into duct 16 for subsequent delivery to the passenger compartment. Simultaneously herewith the valve 60 retains its original setting as of positions $A_1$, $B_1$, and $C_1$ of plate 202 and arm 210 through the continued course of movement along portion 216 of cam 206. The switch 94 also remains dormant at this point in following the normal arcuate contour of cam surface 208 such that as of this stage of operation the air is solely impelled through the heater system of the vehicle to the air entering duct 14.

At position $E_1$ in its course of oscillation actuator disc 202 causes the movement of the cam surface 208 to a position wherein the first stage of cam riser 224 engages the switch 94 thus effecting an operation of the air impeller at low speed. With this movement the post 50 which has previously traversed the full limit of cam 204 moves in the arcuate path of portion 212 of cam 204 and thus maintains its setting of $H_2$ and the post 52 continues in portion 216 of cam 206 such that the valve as before remains in a constant position. The operation of the air impeller at low speed assists the impact motion of the air through the heater for delivery to the passenger compartment.

The further movement of actuator disc 202 and arm 210 to position $F_1$ changes the condition of position $E_1$ operation of the valves 58 and 60 only to the extent that the switch 94 is moved to full speed operation of the air impeller through the engagement thereof with the second step of riser 224. At this position the post 52 has passed through the full length of portion 216 of cam 206 and the post 50 continues in arcuate 214 of cam 204.

Any clockwise motion of arm 210 and actuator disc 202 from position $F_1$ to $G_1$ modulates the amount of heated air to be delivered through ducting 22 to the windshield with the air impeller in full or second speed operation as switch 94 rides on the arcuate portion of the second step of riser 224 of cam surface 208 such that the valve 60 can assume any position from full closed as shown at J in full lines of Fig. 10 or the full open dotted line $J_1$ when the control arm is in the position $G_1$. The position of valve 58 remains constant as the post 50 further follows the arcuate path 212 of the cam 204.

With reference to actuator discs 36 or 202 it is to be understood that the arms 82 and 210 respectively thereof can be moved to any desired position for the proper operation of the heating ventilating system associated therewith by merely having the arm traverse the position or positions that may lie intermediate the desired new position and the previously established position as it is not necessary that arms 82 and 210 and the respective actuator discs 36 and 202 forming an integral part thereof be moved either continuously clockwise or counter-clockwise.

Fig. 12 discloses the provision of a knob or button 300 for use on either of the actuator discs 36 or 202 as a replacement for the arms 82 and 210 if such structure is found more desirable as to location and arrangement with regard to a vehicle instrument panel upon which the switch mechanisms are to be mounted.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An actuator mechanism for controlling the operation of a vehicle heating system, having air flow ducts, comprising a stationary member, a disk member pivoted on the stationary member having a pair of cam surfaces therein in the form of slots extending radially into the disk member, a pair of spaced levers pivoted upon fixed axes on the stationary member the free ends of each of which are engaged respectively by a cam surface of one slot of the member pivoted on the stationary member, a pair of air control valves pivoted about fixed axes each in separate ducts of the heating system and means connected between the free ends of each of the levers and one of the pair of valves for transmitting motion therebetween, said air control valves being moved from one extreme closed position through engagement of the means connected between the respective free ends of the levers and one of the pair of valves when said means are in movable engagement with the radially extended slots.

2. A mechanism for controlling the flow of air through a vehicle heating system, having air flow ducts, comprising a pivotal member having a plurality of cam surfaces thereon including a pair of like oppositely disposed slots extending radially into the pivotal member and a surface on the periphery of the member intermediate the connection of the radially extended slots with the periphery of the member, a pair of levers pivoted about fixed axes arranged in spaced relation to one another, each of the levers having its free end engageable with one of the pair of cam surfaces formed by the slots, a blower control switch engageable with the cam surface on the periphery of the member, a pair of air control valves pivotal about fixed axes in air ducts of the heating system and separate means for connecting the free ends of each lever respectively with one of the pair of valves, said air control valves being movable from one extreme position of movement to another extreme position of movement through the movable engagement of the means connecting the free ends of each lever with the respective valves with the cam surfaces provided by the radially extended slots.

3. A mechanism for controlling the flow of air through a vehicle heating system, having a plurality of air flow ducts, comprising a stationary member, a disk member pivoted on the stationary member having a plurality of cam surfaces, two of which are in the form of slots having portions extending in a direction radially to the axis of the disk member and one on the periphery of the disk member and a manually operable element integral therewith, a pair of levers arranged in spaced relation to one another pivoted upon fixed axes on the stationary member, the free end of each lever engaged by a cam surface of one of the slots, a pair of valves each adapted to be pivotally arranged upon fixed axes in a portion of the air conveying ducting of the heating system for controlling the flow of air therethrough, means connecting the free end of each lever to its respective associated valve, and a blower control switch engaged by the cam surface on the periphery of the disk member, said valves and blower control switch being independently and conjointly operable with one another upon oscillation of the pivoted member over a predetermined arc of movement wherein through the movable engagement of the free end of each lever with its respective cam slot, the valves will be controlled for movement between opposite limit positions thereof.

4. A mechanism for controlling the flow of air through a vehicle heating system comprising a stationary member, a disk member pivoted on the stationary member over a predetermined arc having a pair of predetermined arranged oppositely disposed like cam surfaces in the form of slots extending radially into the disk member, said stationary member having a plurality of spaced arcuately arranged recesses on a face surface thereof and said pivoted member having a spring pressed member on a face surface thereof engageable with the recesses upon oscillation of the pivoted member relative to the stationary member, a pair of like oppositely disposed levers pivoted upon fixed axes on the stationary member in spaced relation to one another the free end of each lever being engageable with one of the cam surfaces formed by the slots, a pair of pivotal air control valves adapted to be arranged in different portions of the air ducting of the heating system, a Bowden wire connection between the free end of each lever and the valve to be actuated thereby and means for actuating the pivoted member, said means effective upon movement in one direction from a center position to cause actuation of one lever and a consequent movement of the valve connected thereto while the other is maintained stationary whereas movement in an opposite direction causes a reversal condition of actuation of the respective levers wherein the first valve is held stationary and the second valve is moved, said cam surfaces formed by the slots being of predetermined shape permitting of the proper desired positioning of the valves relative to one another in their respective duct locations upon manipulation oscillation of the pivoted member.

5. A mechanism for controlling the flow of air through a vehicle heating system having a plurality of interconnected ducts comprising a stationary member, a disk member over a predetermined arc having a plurality of predetermined arranged cam surfaces thereon two of the cam surfaces of which are formed by slots having portions extending inwardly towards the axis of the disk member and other portions extending arcuately about the axis of the disk member and a surface formed on the periphery of the disk member, said stationary member having a plurality of spaced arcuately arranged recesses on a face surface thereof and said pivoted member having a spring pressed member on a face surface thereof engageable with the recesses upon oscillation of the pivoted member relative to the stationary member, a pair of levers pivoted upon a stationary member in spaced relation to one another, the free end of each lever engageable respectively with one of the cam surfaces of the slots, a pair of air control valves adapted to be arranged in different portions of the air ducting of the heating system, a Bowden wire connection between the free end of each lever and the valve to be actuated thereby, means connected to the pivoted disk member for actuating same, and a blower switch engageable by the cam surface on the periphery of the disk member, said cam surfaces formed by the slots and the cam surface on the periphery of the disk member being of predetermined shape relative to one another providing for the desired relative operation of the valves and blower switch to one another upon the oscillation of the pivoted member relative to the stationary member wherein the radial portions of the slots as engaged by the free end of each lever provide for a movement of the valves whereas the arcuate portion of the slots do not effect any movement of the valves.

6. A mechanism for controlling the flow of air through a vehicle heating system having, interconnected ducting, comprising a stationary member, a disk member pivoted on the stationary member having two cam surfaces in the form of slots of unlike configuration to one another with portions of each of the slots extending radially inwardly towards the axis of the disk member and a cam surface on the periphery of the disk, a pair of levers pivoted on the stationary member in spaced relation to one another the free end of each lever being engaged by a cam surface of the respective slots for the actuation thereof in accordance with the specific design of the cam surface of the particular slot upon oscillation of the pivoted member, a pair of pivotal air flow control valves in different portions of the ducting of the system, means connecting each of the levers near its free end respectively to one of the valves, an air impelling apparatus having a switch thereof engaged by the peripheral cam surface of the disk member for controlling the operation thereof, and means cooperating between the stationary and pivoted member for frictionally holding the members together in several selected relative positions, said lever as connected between the cam slots and valves being operable in movable engagement with the cam surfaces of the radially extended portions of the slots to move the valves from one position to another.

HOMER CHARLES SIMONS.

References Cited in the file of this patent

UNITED STATES PATENTS

| Number | Name | Date |
| --- | --- | --- |
| 691,968 | Paine | Jan. 28, 1902 |
| 1,710,002 | Pearson | Apr. 23, 1929 |
| 1,958,301 | Greene | May 8, 1934 |
| 2,304,643 | Hans | Dec. 8, 1942 |
| 2,325,427 | Reynolds | July 27, 1943 |
| 2,418,275 | O'Toole et al. | Apr. 1, 1947 |
| 2,488,278 | Findley | Nov. 15, 1949 |